United States Patent [19]
Vandehei

[11] 4,189,205
[45] Feb. 19, 1980

[54] COATED COPPER REFLECTOR

[75] Inventor: Peter T. Vandehei, Ventura, Calif.

[73] Assignee: Infrared Industries, Inc., Santa Barbara, Calif.

[21] Appl. No.: 879,224

[22] Filed: Feb. 21, 1978

[51] Int. Cl.$^2$ .............. G02B 5/08; G02B 5/28; C03C 17/08
[52] U.S. Cl. .................. 350/1.7; 350/164; 427/160
[58] Field of Search .............. 350/1.7, 164.6, 288; 427/160, 162, 164, 165

[56] References Cited

U.S. PATENT DOCUMENTS

| | | | |
|---|---|---|---|
| 2,519,722 | 8/1950 | Turner | 350/164 |
| 2,854,349 | 9/1958 | Dreyfus et al. | 350/164 |
| 3,758,185 | 9/1973 | Gelber | 350/1.7 |
| 4,065,626 | 12/1977 | Franz | 427/165 |
| 4,093,349 | 6/1978 | Mills | 350/288 |
| 4,142,006 | 2/1979 | Choyke et al. | 427/162 |

OTHER PUBLICATIONS

Reale, *Manufacturing Optics International*, vol. 22, No. 1, Jul. 1969, pp. 9, 11–13.
Hass et al, *Jour. of Vacuum Science and Technology*, vol. 4, No. 2, Mar./Apr. 1967, pp. 71–79.

*Primary Examiner*—Ronald J. Stern
*Attorney, Agent, or Firm*—Harry W. Brelsford

[57] ABSTRACT

A reflector or mirror for the visible and rear infrared spectrum is formed by multicoating copper with one-fifth wavelength and three-quarter wavelength films. These films are alternating low and high index films, and $MgF_2$ and $TiO_2$ are presently preferred. A thin bonding layer of $TiO_2$ is used to secure adhesion of the $MgF_2$ to the copper. This coating enhances the reflectance in the visible range without appreciable degradation of reflectance in the near infrared, so that the resultant curve of reflectance-versus-frequency is substantially flat. The resulting coating is hard and tough and may be cleaned without injury and withstands high humidity.

6 Claims, 2 Drawing Figures

COATED COPPER REFLECTOR

This invention relates to high-quality mirrors or reflectors and has particular reference to coated copper as a high-quality mirror for the visible and near infrared spectrum; that is, from four hundred millimicrons to about eleven hundred millimicrons in wavelength.

BACKGROUND OF THE INVENTION

Presently available high-reflectivity mirrors have serious commercial and military limitations. Such mirrors are first surface mirrors and consist primarily of a thin film of reflective metal deposited on the surface of a carefully polished glass section, generally referred to as a substrate. The mirror surface follows the glass surface whether flat, concave, convex, spherical, or aspherical.

Freshly deposited silver has the best reflectance of the 0.4 to 1.1 micron spectrum, but it deteriorates with time. Freshly deposited copper and gold have a poor reflectance over much of the visible spectrum, but are excellent reflectors over the near infrared range. Aluminum has considerably less reflectance than copper, gold, or silver over the near infrared, but has good reflectance over the visible spectrum. Aluminum has the inherent quality of quickly oxidizing its surface with a coating of aluminum oxide which protects the reflectance of the metallic aluminum without appreciably reducing its reflectance. This characteristic of aluminum to maintain its surface with time has led to the use of aluminum as the reflector for commercial applications.

Aluminum mirror surfaces, however, have a serious commercial drawback: aluminum is a soft metal, and even when coated with a hard coating, the cleaning of the surface causes deterioration after repeated cleanings.

Copper, by contrast, is a comparatively hard metal and when coated may be readily cleaned without deterioration after repeated cleanings. Pure copper is harder and more durable than pure aluminum; therefore, the coated copper surface is harder and more durable than the coated aluminum surface. However, copper's pure reflectance over much of the visible range has heretofore limited its use to special applications.

SUMMARY OF THE INVENTION

I have discovered a coating for copper that enhances its reflectance in the visible range without seriously impairing its reflectance in the near infrared. This coated copper reflectance is superior to aluminum over much of the visible range and over the entire near infrared range. Furthermore, my coated copper reflector does not have the dip in reflectance curves which aluminum experiences at wavelengths near nine hundred millimicrons.

I coat a suitable substrate with copper over a short period of time, preferably under two minutes, to reduce oxidation which occurs even at coating vacuums. I next quickly coat the copper with a protective and bonding layer, presently titanium dioxide, $TiO_2$. Next, I apply alternating layers of low-index durable material and high-index durable materials, and the presently commercially available coatings meetings these descriptions are magnesium fluoride, $MgF_2$ and titanium dioxide, $TiO_2$. I select a critical visible wavelength which must be enhanced and presently prefer five hundred millimicrons. For this preferred wavelength, the thickness of coatings measured in wavelengths, is 0.2 $MgF_2$, 0.25 $TiO_2$, 0.25 $MgF_2$, and 0.25 $TiO_2$. The thickness of the bonding layer is not critical; all that is needed is good coverage of the copper to prevent oxidation, and a thickness of thirty Angstroms is suitable.

DETAILED DESCRIPTION

Various objects, advantages, and features of the invention are apparent in the following description and claims, in which:

Figure 1:
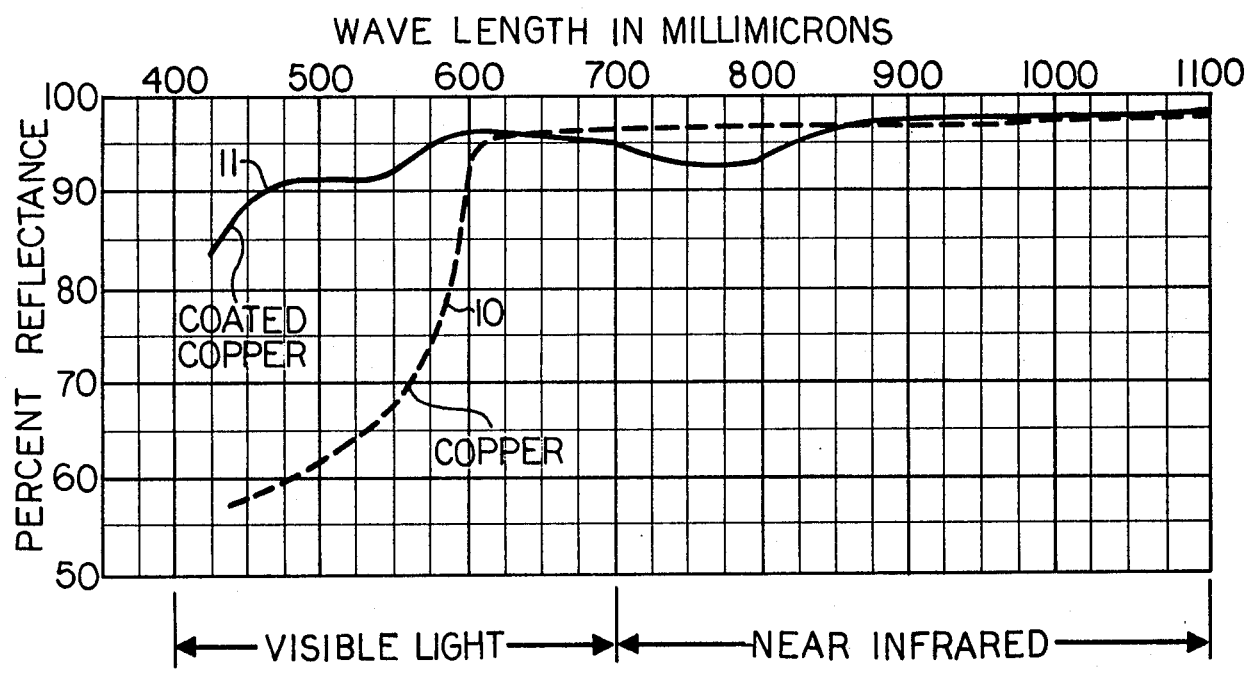
FIG. 1 is a graph comparing the reflectance of my coated copper with that of the pure metal.

Referring to FIG. 1, there is illustrated on the broken line 10 the reflectance of copper over the visible spectrum and the near infrared spectrum. There it will be noted that the reflectance of copper is extremely poor from four hundred millimicrons up to six hundred millimicrons, and thereafter the curve is practically flat. Furthermore, from about six hundred fifty millimicrons the reflectance is at a very high percentage, about ninety-six to ninety-seven percent. This compares quite favorably with aluminum, the presently used commercial reflector in that aluminum is about ninety percent from four hundred millimicrons up to about seven hundred millimicrons, and thereafter the reflectance of aluminum takes a serious dip in its curve, which centers about eight hundred fifty millimicrons, and thereafter recovers at twelve hundred millimicrons to a fairly high level of about ninety-five percent.

Referring still to FIG. 1, a solid curve 11 indicates the reflectance of copper coated in accordance with this invention, as measured under the same circumstances as the uncoated copper of curve 10. There it will be noted that at the lower end of the visible spectrum near the ultraviolet the reflectance of copper has been improved from about fifty-seven percent to about eighty-four percent. Thereafter, the improvement is rapid. At four hundred seventy-five millimicrons the reflectance of my coated copper has improved to ninety-one percent as contrasted to sixty percent for copper. The curve of the coated copper is then flat to about five hundred twenty-five millimicrons, and thereafter the reflectance increases to a peak of about ninety-six percent at six hundred millimicrons. There is then a slow decrease in reflectance until at about seven hundred seventy-five millimicrons the bottom of the curve is reached at ninety-three percent. It will be noted, however, that even at this dip in reflectance the difference between my coated copper and pure copper is only four percent. At eight hundred seventy-five millimicrons my coated copper is superior to the pure metal and retains its superiority clear into the infrared range.

I attain this enhanced reflectance of copper by coating the copper with alternate low-index and high-index transparent coatings. The low-index coating must be the first coating on the copper, and of the presently available low-index materials magnesium fluoride is by far the hardest and most resistant to abrasion. Magnesium fluoride, howver, has a poor adherence to copper and fails and sloughs off under conditions of high humidity. I have found, therefore, that it is necessary to coat the copper with a bonding layer so as to obtain good adhesion of the magnesium fluoride non-oxide coating to the copper. I presently prefer titanium dioxide as the coating on the copper to secure bonding of the subsequent layers. The thickness of this bonding layer is not critical and may be as thick as two or three millimicrons. As described hereafter, this same bonding layer acts as a protective layer also to prevent oxidation of the metallic copper.

While customarily the optically active layers are one-fourth wavelength, I have found that the first layer should be less than one-fourth wavelength when applied to a copper reflector and that this layer should have an optical thickness of one-fifth of the selected wavelength. This first optically active layer is a low-index refraction material, and the best commercially available material for this purpose is magnesium fluoride, MgF. The next three layers should all be one-quarter wavelength, and the second layer should be of high-index material, the third layer of low-index material, and the fourth layer, or outermost, of high-index material. I have found that magnesium fluoride is suitable for the low-index layers and that titanium dioxide is suitable for the high-index materials. These optically active layers should be selected from the groups of materials available that give the hardest and toughest films for the high-index materials and the hardest and toughest for the low-index materials.

Figure 2:
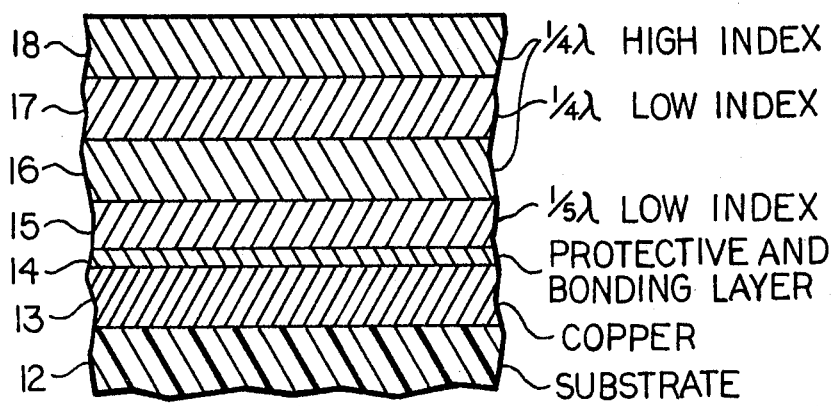
FIG. 2 is a sectional view through a reflector embodying the invention and showing the various layers.

The physical structure of these optical layers is illustrated in FIG. 2, wherein a substrate, preferably polished glass 12, has deposited thereon or otherwise formed a layer of pure copper 13 upon which is disposed the protective and bonding layer 14. The optically active layers are a first layer of low-index material 15, a high-index layer of material 16, a third layer of low-index material 17, and a fourth optically active layer of high-index material 18.

The selection of the wavelengths is important inasmuch as a selected short wavelength in the visible range will improve the low end of the reflectance curve for the coated copper, but will degrade the natural reflectance of copper in the near infrared. I have found that the best compromise for improving the reflectance in the visible light range without serious degradation in the near infrared is a wavelength of five hundred millimicrons. This results in a performance above ninety percent for more than two-thirds of the visible light spectrum with a drop only in the shorter wavelength. The selected wavelength, accordingly, to get this uniformity of performance should be in the range of four hundred seventy-five millimicrons to about five hundred twenty-five millimicrons. If a shorter wavelength is selected, for example, four hundred fifty millimicrons, then the entire visible range may be enhanced above ninety percent, but with more degradation in the near infrared than the solid curve 11.

If the number of optically active layers is more than four, the visible spectrum may be enhanced, but at the expense of the infrared. If only two layers are used, then the improvement in the visible range is poor. With regard to the choice of the materials used for the high-index and low-index layers or coatings, the selection of titanium dioxide and magnesium fluoride appears to be optimum for the commercially available materials that are hard and tough. For example, titanium dioxide has a refraction index of 2.30 to 2.40, whereas the next softer material available is cerium dioxide, $CeO_2$, with an index from 2.1 to 2.2. A mixture of titanium dioxide and zirconium dioxide may be used, but the index is even lower for this mixture. Among the low-index materials, there are other materials of lower index than magnesium fluoride, but these are all softer or more soluble, and therefore are not suitable for high-quality mirrors. Among the materials with a higher index are quartz, but the use of magnesium fluoride has proved to be eminently satisfactory. In summary, therefore, I select the hardest and most durable of the low-index materials with the lowest index, and I select from the high-index materials those that are the hardest and most durable with the highest index.

It will be obvious to those skilled in the art that these high-index or low-index materials that are of differing indices may be used, but the durability and hardness will be adversely affected, so that the mirror will be difficult, if not impossible, to clean. Also, coatings of lower index will adversely affect reflectance. By lowering the high index or raising the low index, reflectance is reduced about one percent for each 0.1 change in the indices.

With regard to the method of making my mirror, the following has given satisfactory results. I first clean a glass substrate having the desired contour on the surface and then deposit copper thereon with an electron gun in a vacuum as is well known in the industry. The copper is applied rapidly and until the film of copper is opaque at about two thousand Angstroms. The copper film should be applied in two minutes or less to reduce oxidation of the copper, which occurs even in the high vacuum of the electron gun apparatus. For this reason, I immediately thereafter apply the bonding coat of titanium dioxide, and this is applied thick enough to coat the copper so that it will be protected from oxidation. The same coat acts as a bonding layer for the magnesium fluoride as previously mentioned. This protective coat is particularly important because of the fact that the substrate has the copper applied at a temperature of about one hundred degrees Centigrade, or Celsius, and the substrate coated with the copper must then be raised to a temperature of about two hundred fifty degrees Centigrade for applying the optical coatings. This necessarily takes place over a long time period from one-half to three-quarters of an hour, and very substantial oxidation of the copper would occur, even in the high vacuum of the apparatus if this coat were not applied. The other four coats are then alternately applied at this higher temperature. Present-day commercial apparatus permits the control of the thickness of the optical layers with a tolerance of two percent on the magnesium fluoride and about four percent on the titanium dioxide. The layer should be as close to the fractional wavelength thicknesses as possible, and these tolerances have produced satisfactory results. The finished product is silver in appearance and is extremely hard and may be readily cleaned with the same techniques used to clean coated lenses. The finished reflector is also extremely resistant to water and humidity and can satisfactorily perform in most environments.

I have described my invention with respect to the presently preferred embodiments thereof as required by the statutes, but I do not limit myself to the precise materials disclosed. It will be obvious to those skilled in the art that modifications and variations may be made in the materials and dimensions and apparatus and obtain similar results. Accordingly, the following claims encompass all such variations and modifications that fall within the true spirit and scope of the invention.

I claim:

1. In a metallic copper reflector having an enhanced reflectance in the visible wavelength range without substantial degradation in the near infrared and resistant to humidity and abrasion, the improvement comprising:
  (a) first layer on said copper of hard transparent material having a thickness of twenty to one hundred Angstroms;
  (b) a second layer of low-index transparent material having an optical thickness of 0.2 of a visible wavelength;
  (c) a third layer of high-index transparent material having an optical thickness of one-fourth of said visible wavelength;
  (d) and at least one pair of layers of first low-index and then high-index transparent materials, each layer having a thickness of one-fourth of said wavelength.

2. A reflector as set forth in claim 1 wherein said first layer is $TiO_2$.

3. A reflector as set forth in claim 1 wherein the low-index material is $MgF_2$ and the high-index material is $TiO_2$.

4. A reflector as set forth in claim 1 wherein the wavelength is in the range of four hundred seventy-five to five hundred twenty-five millimicrons.

5. In a metallic copper reflector having an enhanced reflectance in the visible wavelength range, the improvement comprising:
  (a) a protective layer of hard transparent material on said copper;
  (b) a first layer of low-index material on said protective layer having an optical thickness of 0.2 of a selected visible wavelength;
  (c) a second layer of high-index transparent material on said low-index layer having an optical thickness of one-fourth of said wavelength;
  (d) and at least one pair of layers placed on said second layer of first low-index and then high-index transparent material, each layer having an optical thickness of one fourth of said visible wavelength.

6. The method of improving the reflectance of copper in the visible spectrum without substantial degradation in the near infrared range, which comprises:
  (a) selecting a wavelength in the visible spectrum about which enhancement is desired;
  (b) depositing an opaque layer of copper upon a substrate over a time period not exceeding two minutes;
  (c) immediately thereafter coating the copper with a transparent layer of material of a thickness sufficient to protect the copper from oxidation;
  (d) coating the protected surface with a low-index transparent material to a thickness of 0.2 of the selected wavelength;
  (e) and coating said low-index material with alternate layers of first high-index and then low-index transparent material, each having a thickness of one-fourth of said selected wavelength until at least three of said coatings are added.

* * * * *